March 23, 1965

E. J. EISNER 3,174,568

WEIGHING SCALE HAVING CONE PIVOTS
AND CONCAVITY BEARING SURFACES

Filed Aug. 13, 1962

INVENTOR.
Edwin J. Eisner
BY
ATTORNEYS.

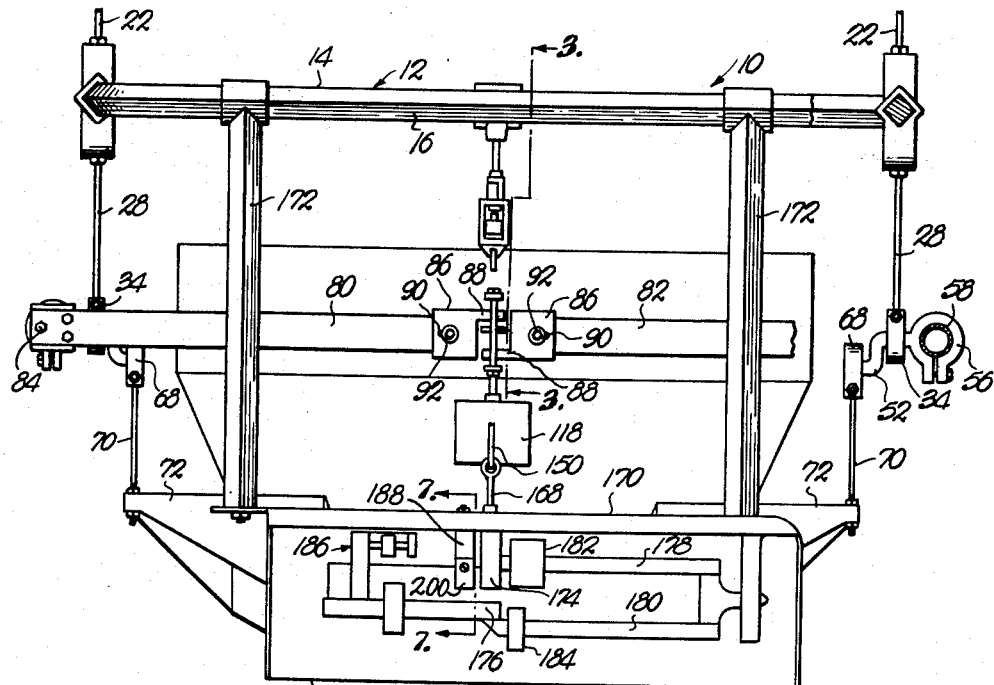

United States Patent Office

3,174,568
Patented Mar. 23, 1965

3,174,568
WEIGHING SCALE HAVING CONE PIVOTS AND CONCAVITY BEARING SURFACES
Edwin J. Eisner, Kansas City, Mo., assignor to Eisner Scale Company, Kansas City, Mo., a corporation of Missouri
Filed Aug. 13, 1962, Ser. No. 216,514
14 Claims. (Cl. 177—247)

This invention relates to a weighing scale, and more particularly, to such a scale having improved pivot means at the various load bearing points thereof.

It is the primary object of the present invention to provide a weighing scale which is provided with improved pivot means at the load bearing points thereof to the end that friction at said points is substantially reduced to thereby result in a weighing device more accurate than weighing scales heretofore utilized.

Another object of the present invention is the provision of cone pivot means in the nature of a cone element and a bearing member having a concave bearing surface for receiving the element, which pivot means is disposed at each load bearing point of the weighing scale of the aforesaid character wherein the use of conventional knife edges at such load bearing points is obviated and the disadvantages inherent in the use of such knife edges are substantially eliminated.

Still another object of the present invention is the provision of cone pivot means of the aforesaid character which is relatively inexpensive and is constructed in such a manner so that the same may be readily replaceable and made interchangeable at the various load bearing points to thereby minimize the over-all cost of construction and maintenance of the weighing scale.

Yet another object of the present invention is the provision of a weighing scale having cone pivot means at the load bearing points thereon and wherein the pivot means may be replaced and interchanged at the operating location of the weighing scale so that the scale need not be moved to a distant point for maintenance purposes.

Another object of the present invention is the provision of cone pivot means of the type described and wherein the cone elements are shiftably mounted at the various load bearing locations so that the center of gravity of the system may be maintained at a fixed location regardless of the wear on the cone pivot means and the type of object to be weighed.

Other objects of this invention will become apparent as the following specification progresses, reference being had to the accompanying drawings, wherein:

FIG. 2 is a front elevational view of the weighing scale illustrated in FIG. 1, parts being broken away and in section to illustrate details of construction;

FIG. 3 is an enlarged view taken along line 3—3 of FIG. 2;

FIG. 4 is an enlarged view taken along line 4—4 of FIG. 3;

FIG. 5 is an enlarged view taken along line 5—5 of FIG. 3;

Figure 1:
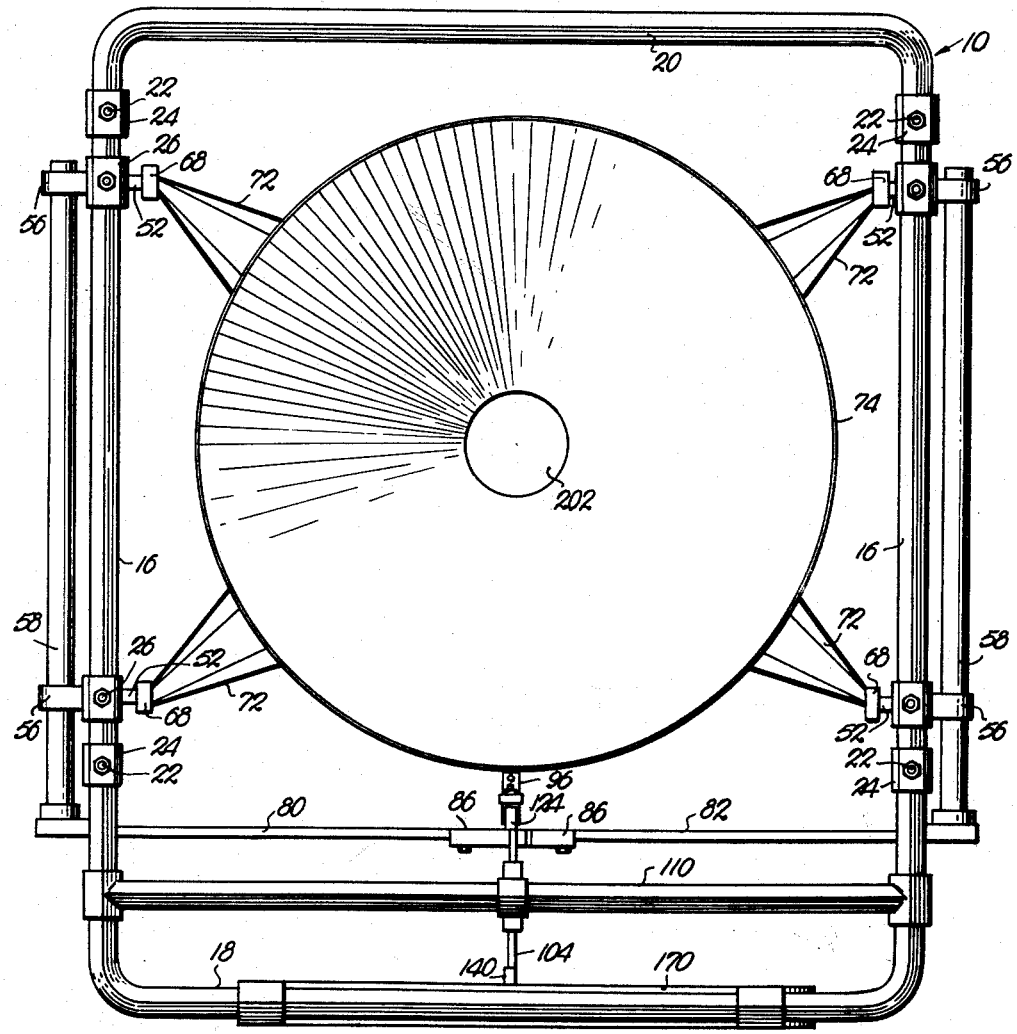
FIGURE 1 is a top plan view of a weighing scale selected to illustrate the concepts of the present invention.

The weighing scale which has been selected to illustrate the concepts of the present invention is broadly denoted by the numeral 10 and is illustrated in FIGS. 1 and 2. Weighing scale 10 includes a support 12 in the nature of a rectangular frame 14 having a pair of side stretches 16, a front stretch 18 and a rear stretch 20. Frame 14 is adapted to be secured to suitable structure such as the ceiling of a building or the like, through the medium of a number of rods 22 secured by brackets 24 to stretches 16 as is clear in FIG. 2.

A pair of brackets 26 is also carried on each stretch 16 and a rod 28 depends from each bracket 26 in the manner illustrated in FIG. 2. The lower end of each rod 28 is operably coupled to the cylindrical bearing 30 secured to the outer ends 32 of a U-shaped bracket 34 illustrated in FIG. 9.

Bracket 34 is provided with a bearing member 36 at the bight 38 thereof, bearing member 36 being rigid to a plate-like element 40 and removably secured to bight 38 by a machine screw 42. Member 36 is provided with a substantially concave bearing surface 44 which normally receives and engages the downwardly extending apex end of a cone element 46 received within a bore 48 in one portion 50 of a Z-shaped arm 52 illustrated in FIG. 8. Bore 48 is partially threaded and receives a setscrew 54 which bears against the upper end of cone element 46 to shift the latter within bore 48, it being clear that element 46 may be press-fitted within bore 48 but permitted to shift therewithin. Portion 50 is integral with a split ring 56 which receives an elongated, tubular member 58 substantially parallel with and below a corresponding stretch 16 as is clear in FIG. 1.

Arm 52 is provided with a portion 60 which is substantially parallel with portion 50 and normally spaced below the latter remote from the interconnection of portion 50 with ring 56. Portion 60 is provided with a bore having an upwardly extending cone element 64 press-fitted therein, and a setscrew 66 threaded in bore 62 for engagement with element 64 to shift the latter with respect to portion 60.

Figure 9:
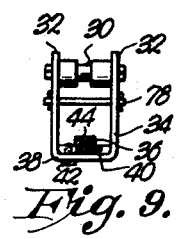
FIG. 9 is a side elevational view of a bracket carrying a bearing member forming a part of the cone pivot means and engageable with a cone element illustrated in FIG. 8.

An inverted, U-shaped bracket 68 similar in all respects to bracket 34 of FIG. 9, is provided with a bearing member similar to member 36 for receiving the apex end of cone element 46. A rod 70 is coupled with the cylindrical bearing of bracket 68 and extends downwardly to and is coupled with a bracket 72 rigid to the funnel-shaped side of a hopper 74 representing the object to be weighed. Ring 56 is clamped on member 58 by fastening means 76 so that portions 50 and 60 are generally horizontal when arm 52 is in an equilibrium or no-load condition. To assure that brackets 34 and 68 remain coupled with portions 50 and 60 respectively, keyed shafts 78 are carried on brackets 34 and 68 in the manner shown in FIG. 9.

It can be appreciated that for each rod 28 there are a corresponding rod 70, a corresponding arm 52, and a corresponding bracket 72. However, it is further to be noted that the arms 52 corresponding to the rods 28 secured to one stretch 16 are coupled through rings 56 to a corresponding member 58 as is clear in FIG. 1.

A pair of elongated arms 80 and 82 are secured to the normally front ends of members 58 by bolts and extend toward each other as is clear in FIG. 2. Arms 80 and 82 terminate just short of a location midway between members 58 and each of said arms 80 and 82 is provided with a bracket 86 having an extension thereon, as is clear in FIG. 2. Brackets 86 are provided with slots 90 therein for receiving bolts 92 to permit limited shifting movement of brackets 86 relative to the respective arms 80 and 82. It is to be noted in FIG. 2 that extension 88 of arm 80 is vertically spaced with respect to extension 88 of arm 82.

Figure 8:
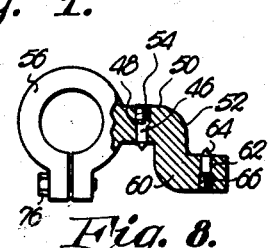
FIG. 8 is an enlarged view of the structure at one of the load bearing points of the weighing scale, illustrating the cone elements of the cone pivot means forming a part of the present invention.

As is clear in FIG. 3, extensions 88 are provided with downwardly extending cone elements 94 therein, elements 94 being received within bores in extensions 88 in the same manner as illustrated in FIG. 8 in the case of arm 52. Moreover, setscrews are provided for urging cone elements 94 outwardly with respect to the corresponding extensions 88.

A bracket 96 having vertically spaced platforms 98 and 100, is carried by means of a rod 102 at one end of a beam 104 secured by cone pivot means 106 to a rod 108, in turn being secured to a crosspiece 110 forming a part of frame 14 and disposed adjacent front stretch 18, as is clear in FIG. 1. Platforms 98 and 100 are provided with bearing members 112 and 114 respectively, similar in all respects to member 36 illustrated in FIG. 9 for receiving the apex ends of cone elements 94 as is clear in FIG. 3. A rod 116 extends downwardly from platform 100 and is secured to counterbalance weight structure 118.

Figure 6:
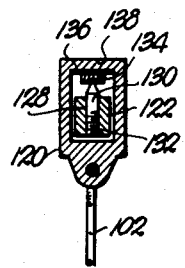
FIG. 6 is an enlarged view taken along line 6—6 of FIG. 3.

Rod 102 is secured to a bracket 120 surrounding an extension 122 on a slotted bracket 124 secured to the corresponding end of beam 104 by a bolt 126 within the slot of bracket 124. As is clear in FIG. 6, extension 122 is provided with a bore 128 for receiving a cone element 130 and a setscrew 132 for shifting cone element 130 within bore 128. A bearing member 134 similar in all respects to member 36, is removably carried by a plate 136 to the underside of the top portion 138 of bracket 120.

A bracket 140 is carried at the opposite end of beam 104, illustrated in FIG. 4, and is substantially identical in all respects to bracket 124. A bolt 142 within the slot of bracket 140 secures the latter to beam 104 so that the extension 144 of bracket 140 extends in the direction opposite to the direction in which extension 122 extends. A bracket 146 identical in all respects to bracket 120 and provided with similar cone pivot means, is coupled with extension 144 for supporting a rod 148 extending vertically downwardly and coupled with a take-up device 150, as is clear in FIG. 3.

Pivot means 106 is illustrated in FIG. 5 and includes a U-shaped bracket 152 surrounding beam 104 and secured thereto by bolt means 154. A pair of projections 156 extend laterally from bracket 152 in opposed directions and mount thereon a pair of downwardly extending cone elements 158 and associated setscrews 160 for shifting elements 158 relative to projections 156. A bracket 162 surrounds bracket 152 and is provided with portions 164 underlying projections 156. Portions 164 removably carry thereon bearing members 166 identical in all respects to bearing members 36 for receiving respective cone elements 158 in the manner shown in FIG. 5.

Device 150 is secured to a rod 168 which passes through an opening in the top of a housing 170 secured to front stretch 18 by pair of vertically disposed, parallel stretches 172 as is clear in FIG. 2. Rod 168 is secured to an inverted U-shaped bracket 174 similar in all respects to bracket 162 and provided with bearing members corresponding to members 166 on bracket 162. The bearing members on bracket 174 receive cone elements (not shown) on opposed sides of a scale beam 176 within housing 170 and below beam 104. Beam 176 is provided with sections 178 and 180, each having suitable counterbalance weight means 182 and 184 thereon. Sections 178 and 180 may be provided with graduations thereon and weight means 182 and 184 may shift along the lengths of sections 178 and 180 for counterbalancing purposes. Additional counterbalance weight means 186 is provided on beam 176 at the end of the latter opposite to the end provided with sections 178 and 180.

Figure 7:
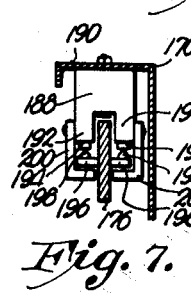
FIG. 7 is an enlarged, cross-sectional view taken along line 7—7 of FIG. 2.

A bracket 188 carried on the underside of a horizontal panel 190 forming a part of housing 170, as is clear in FIG. 7, extends downwardly from panel 190 and is provided with a pair of legs 192 having downwardly facing bearing members 194 thereon similar in all respects to bearing members 36.

A pair of projections 196 extend laterally from beam 176 and carries therewith upwardly directed cone elements 198 which are received in and engage the bearing surfaces of respective overlying members 194. L-shaped retainer members 200 are secured to legs 192 and are provided with portions underlying projections 196 but spaced therefrom and from beam 176.

It is evident that all load bearing points of scale 10 are provided with cone pivot means including a cone element and a bearing member having a substantially concave bearing surface normally in engagement with the apex end of a corresponding cone element. The use of conventional knife edges is thus obviated and friction at such load bearing points is substantially reduced, since the load is concentrated at a point, namely, the point of contact between the cone element and the bearing surface of the corresponding bearing member. The cone element may thus shift relative to the bearing member while still retaining the point contact with the bearing surface.

In operation, with hopper 74 empty, counterbalance weight means 182, 184 and 186 is adjusted to balance beam 176. In this condition, the various cone elements are at such positions so that arms 80 and 82 are substantially horizontal, and portions 50 and 60 of each arm 52 are also substantially horizontal. Scale 10 is thus ready to weigh a quantity of material contained within hopper 74.

The outlet opening 202 in the bottom of hopper 74 is closed, and material is deposited therewithin causing rods 70 to move downwardly and thus swing arms 80 and 82 in a downward direction. Such movement of arms 80 and 82 is sufficient to pivot beam 104 so that rod 148 is raised to in turn raise sections 178 and 180 of beam 176. Counterbalance weight means 182 and 184 are then shifted to return beam 176 to its equilibrium position and the imbalance, representing the weight of the materials added to hopper 74, is measured by the positions of weight means 182 and 184 on sections 178 and 180.

The cone pivot means forming a part of the present invention may be quickly replaced without removing scale 10 from its operating location. For instance, hopper 74 may be propped up so that the load will be removed from arms 52 and thereby arms 80 and 82. Beam 176 will then move downwardly until projections 196 rest upon the retaining members therebelow. The positions of the various cone elements may be varied by adjusting the corresponding setscrews, and the bearing members may be replaced by removing the same from the various brackets and affixing new bearing members thereto. The time required for such replacement is, therefore, kept to a minimum and scale 10 is placed in operation once again in much less the time required to replace the various knife edge pivot means of conventional weighing scales.

Each arm 52 has been constructed so that the apexes of cone elements 46 and 64 lie substantially in the same horizontal plane when the arm 52 is in the equilibrium position thereof. This is to assure that the load represented by hopper 74 will be properly transmitted to the corresponding member 58.

Rods 70 serve as connectors for coupling hopper 74 with arms 52 and thus with beam 104. Similarly, rods 148 and 168, together with device 150, serve as a connector for coupling beam 176 with hopper 74 through arms 52, 80 and 82.

The cone pivot means of the present invention permit much greater freedom of movement of the various parts than is capable with knife edges of conventional weighing apparatus. This is due, of course, to the point contact of the cone elements in engagement with the corresponding surfaces rather than the line contact obtained with the use of knife edges and corresponding bearing surfaces.

Although the bearing members described herein have been set forth as being provided with concave bearing surfaces, it is clear that the same may be provided with frusto-conical surfaces without departing from the spirit of the invention.

Having thus described the invention, what is claimed as new and desired to be secured by Letters Patent is:

1. A weighing scale comprising:
   a support;
   an elongated member having a pair of spaced arms secured thereto and projecting laterally therefrom;
   first cone pivot means for pivotally mounting one of said arms intermediate the ends thereof on said support;
   a connector adapted to be secured to an object to be weighed;
   second cone pivot means for pivotally mounting said connector on said one arm adjacent the outermost end of the latter;
   an elongated beam having shiftable counterbalance weight means thereon;
   third cone pivot means for pivotally mounting said beam on said support; and
   means including fourth cone pivot means for operably coupling said beam on said other arm adjacent the outermost end of the latter to permit said beam to pivot with respect to said other arm, each cone pivot means including a cone element and a bearing member having a substantially concave bearing surface, each cone element being in substantially point contact engagement at the apex thereof with the surface of the corresponding bearing member, said coupling means being provided with counterbalance weight structure normally maintaining said arms and said beam in corresponding equilibrium positions, whereby said beam may pivot relative to said support as said arms swing under the weight of said object and until said weight means is shifted to return said beam to its equilibrium position.

2. A weighing scale as set forth in claim 1, wherein said member is normally horizontally disposed and said one arm is suspended below said support, said connector extending below said one arm.

3. A weighing scale as set forth in claim 2, wherein said one arm is provided with a pair of interconnected, substantially parallel, normally vertically spaced portions thereon, the outermost portion being below the portion adjacent said member, the cone element of said first cone pivot means extending downwardly from the upper portion and the cone element of said second cone pivot means extending upwardly from the lower portion with the apexes of said cone elements being in substantially the same horizontal plane.

4. A weighing scale as set forth in claim 3, wherein said portions are each provided with a bore, the corresponding cone element being disposed within said bore, and including screw means within said bore and engageable with the cone element for shifting the latter in said bore.

5. A weighing scale as set forth in claim 1, wherein said coupling means includes a beam transverse to said elongated beam, fifth cone pivot means for pivotally mounting said transverse beam intermediate the ends thereof on said support, a connector having sixth cone pivot means thereon at the ends thereof and disposed adjacent to one end of said transverse beam for pivotally interconnecting said beams, and seventh cone pivot means connecting the outer end of said other arm to the opposite end of said transverse beam.

6. A weighing scale comprising:
   a support;
   a pair of elongated, substantially parallel members normally horizontally disposed below said support and adapted to be positioned on opposed sides of an object to be weighed, each of said members being provided with a pair of arms secured thereto and extending toward the adjacent member;
   first cone pivot means for pivotally mounting a first of said arms of each member on said support;
   a pair of connectors adapted to be secured to said sides of the object below said first arms;
   second cone pivot means for pivotally mounting said connectors on said first arms adjacent the outermost ends thereof;
   a first beam;
   third cone pivot means for pivotally mounting said first beam on said support intermediate said members;
   fourth cone pivot means for pivotally mounting the outermost ends of the other arms of said members on said first beam at one end of the latter;
   a second beam having shiftable counterbalance weight means thereon;
   fifth cone pivot means for pivotally mounting said second beam on said support; and
   sixth cone pivot means for pivotally mounting said second beam on said first beam adjacent the opposite end of the latter, there being counterbalance weight structure coupled with said first beam and disposed for normally maintaining said arms and said beams in corresponding equilibrium positions, whereby an imbalance of weight will be transmitted to said second beam through said arms and said first beam and subsequently counterbalanced by the shifting of said weight means, each of said cone pivot means including a bearing member having a substantially concave bearing surface and a cone element in substantially point contact engagement at the apex thereof with the surface of the corresponding member.

7. A weighing scale as set forth in claim 6, wherein said second beam is disposed below said first beam, said fifth cone pivot means including a bracket carried by said support and having the bearing surface of its bearing member facing downwardly the corresponding cone element extending upwardly from said second beam, said weight structure being disposed for maintaining the last-mentioned cone element in engagement with said bearing surface.

8. A weighing scale as set forth in claim 7, wherein is included an L-shaped retaining member secured to said bracket and provided with a portion underlying and spaced from the cone element.

9. A weighing scale as set forth in claim 6, wherein said fourth cone pivot means includes a bracket having its bearing members facing upwardly and disposed in vertically spaced relationship, the outermost ends of said other arms being relatively vertically spaced, the corresponding cone elements of said fourth means being disposed on and extending downwardly from the outermost ends of said other members respectively.

10. A weighing scale as set forth in claim 6, wherein said sixth cone pivot means is carried on said second beam between said weight means and said fifth cone pivot means.

11. A weighing scale comprising:
    a support;
    an elongated beam having counterbalance weight means thereon;
    a first pivot structure pivotally mounting said beam on said support for vertical swinging movement relative thereto;
    a connector adapted to be operably coupled with an object to be weighed; and
    second pivot structure pivotally mounting said connector on said beam in spaced relationship to said weight means with said pivot structures being in alignment with each other longitudinally of said beam, said weight means being disposed to counterbalance the weight of an object coupled with said connector, each of said structures including a bearing member having a substantially concave bearing surface and a cone element in substantially point contact engagement at the apex thereof with said surface, said first structure being disposed intermediate the ends of said beam, said weight means being disposed on said beam adjacent one end thereof, and said second structure being disposed on said beam between said weight means and said first structure.

12. A weighing scale comprising:

a support;

an elongated beam having counterbalance weight means thereon and provided with a pair of projections extending laterally therefrom;

first pivot structure pivotally mounting said beam on said support for vertical swinging movement relative thereto;

a connector adapted to be operably coupled with an object to be weighed; and second pivot structure pivotally mounting said connector on said beam in spaced relationship to said weight means with said pivot structures being in alignment with each other longitudinally of said beams, said weight means being disposed to counterbalance the weight of an object coupled with said connector, each of said structures including a bearing member having a substantially concave bearing surface and a cone element in substantially point contact engagement at the apex thereof with said surface, said support including a bracket having a pair of spaced arms disposed on corresponding sides of said beam, each of said projections having an outwardly extending cone element thereon, said support including a bracket having a pair of spaced arms disposed on corresponding sides of said beam and provided with a bearing member on each arm for engagement with a corresponding cone element.

13. A weighing scale as set forth in claim 12, wherein portions of said arms underlie corresponding projections, the bearing members being on said portions, said cone elements extending downwardly from corresponding projections and into engagement with corresponding bearing members.

14. A weighing scale as set forth in claim 12, wherein said cone elements extend upwardly from the corresponding projection, said arms being provided with surfaces overlying corresponding cone elements and provided with bearing members on said surfaces for receiving said cone elements.

References Cited by the Examiner

UNITED STATES PATENTS

| 173,669 | 2/76 | Reynolds | 177—247 |
|---|---|---|---|
| 334,051 | 1/86 | Redline | 177—252 |
| 924,962 | 6/09 | Boling | 177—172 |
| 1,267,344 | 5/18 | Zimmerman | 177—258 |
| 2,937,863 | 5/60 | Hadley | 177—196 |
| 3,133,608 | 5/64 | Lau | 177—118 |
| 3,133,609 | 5/64 | Lau | 177—118 |

FOREIGN PATENTS 7,236  3/96  Sweden.

LEO SMILOW, *Primary Examiner.*

LEYLAND M. MARTIN, *Examiner.*